(12) United States Patent
Ueda et al.

(10) Patent No.: US 10,232,548 B2
(45) Date of Patent: Mar. 19, 2019

(54) MANUFACTURING METHOD OF TANK

(71) Applicant: TOYOTA JIDOSHA KABUSHIKI KAISHA, Toyota-shi, Aichi-ken (JP)

(72) Inventors: Masato Ueda, Toyota (JP); Tomoyoshi Kobayashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/478,677

(22) Filed: Apr. 4, 2017

(65) Prior Publication Data

US 2017/0291352 A1    Oct. 12, 2017

(30) Foreign Application Priority Data

Apr. 8, 2016   (JP) ................................. 2016-077737

(51) Int. Cl.
| | | |
|---|---|---|
| *B29C 63/24* | (2006.01) | |
| *B29C 63/00* | (2006.01) | |
| *B29K 101/10* | (2006.01) | |
| *B29K 105/08* | (2006.01) | |
| *B29K 105/00* | (2006.01) | |
| *B29K 307/04* | (2006.01) | |

(Continued)

(52) U.S. Cl.
CPC .......... *B29C 63/24* (2013.01); *B29C 63/0017* (2013.01); *B29C 63/0073* (2013.01); *B29K 2101/10* (2013.01); *B29K 2105/0881* (2013.01); *B29K 2105/253* (2013.01); *B29K 2307/04* (2013.01); *B29L 2022/00* (2013.01); *B29L 2031/7156* (2013.01)

(58) Field of Classification Search
CPC . B29C 63/24; B29C 63/0073; B29C 63/0017; B29K 2101/10; B29K 2307/04; B29K 2105/253; B29L 2022/00; B29L 2031/7156; B29L 2105/0881
See application file for complete search history.

(56) References Cited

U.S. PATENT DOCUMENTS 6,190,481 B1    2/2001   Lida et al.

FOREIGN PATENT DOCUMENTS

DE          695 30 126 T2    12/2003
DE    10 2010 062 682 A1     6/2012
(Continued)

OTHER PUBLICATIONS

Aiyama Takenori, JP2014-133304, Publication Jul. 24, 2014.*

*Primary Examiner* — Vishal I Patel
(74) *Attorney, Agent, or Firm* — Finnegan, Henderson, Farabow, Garrett & Dunner, LLP

(57) ABSTRACT

A manufacturing method of a tank comprises winding a fiber on a liner by hoop winding. The winding comprises: forming an (N+1)-th layer such that a position closer to a center of the liner by a first predetermined distance along an axis line direction of the liner from an end in the axis line direction of an N-th layer is set to position of an end in the axis line direction of the (N+1)-th layer with respect to a direction perpendicular to the axis line direction; and winding the fiber on the N-th layer to provide one winding turn of the fiber, such that a pressing force of pressing the N-th layer in the axis line direction by the fiber is equal to or smaller than a total frictional force in an area in the N-th layer on an edge side in the axis line direction of a fiber winding position.

5 Claims, 8 Drawing Sheets

(51) Int. Cl.
 *B29L 22/00* (2006.01)
 *B29L 31/00* (2006.01)

(56) References Cited

FOREIGN PATENT DOCUMENTS

| | | |
|---|---|---|
| JP | 04-23772 A | 1/1992 |
| JP | 11-82888 | 3/1999 |
| JP | 2010-236614 | 10/2010 |
| JP | 2012-149739 A | 8/2012 |
| JP | 2014-133304 | 7/2014 |
| WO | WO 2012/104690 A1 | 8/2012 |
| WO | WO 2013/142178 A1 | 9/2013 |

* cited by examiner

MANUFACTURING METHOD OF TANK

CROSS-REFERENCE TO RELATED APPLICATIONS

The present application claims priority from Japanese patent application 2016-077737 filed on Apr. 8, 2016, the content of which is hereby incorporated by reference into this application.

BACKGROUND

Field

The present disclosure relates to manufacture of a tank.

Related Art

A filament winding method (hereinafter also referred to as "FW method") is a known technique employed to manufacture a tank for a high-pressure fluid. The FW method winds a carbon fiber impregnated with a thermosetting resin or an ultraviolet curable resin in multiple layers on a liner as a base member of a tank and subsequently cures the resin by heat or ultraviolet ray to form a fiber-reinforced resin layer of high strength on an outer circumferential face of the liner. Hoop winding of winding the carbon fiber approximately perpendicularly to the axis line of the liner may be employed as the winding technique of the carbon fiber on the liner by this FW method. Hoop winding sequentially forms multiple fiber layers of the carbon fiber from the side nearer to the surface of the liner toward the side farther from the surface of the liner. The carbon fiber is wound on the liner or on a previously formed fiber layer with a predetermined tension.

When the carbon fiber is further wound on the fiber layer previously formed by hoop winding, the carbon fiber is likely to be pressed against the fiber layer during winding. This pressing force may skid the carbon fiber and deviate the winding position of the carbon fiber in the fiber layer. Such a positional misalignment of the carbon fiber may deviate the carbon fiber from a predetermined position in the design of the tank. This may result in reducing the strength of the fiber-reinforced resin layer. One proposed method provides a projection by winding the carbon fiber multiple times in an end portion of a fiber layer, in order to reduce the possibility of positional misalignment in an end portion of a next fiber layer that is formed on the fiber layer (as described in JP 2014-133304A).

In the method described in JP 2014-133304A, however, there is a need to wind the carbon fiber multiple times with a higher winding tension in only a predetermined width than a winding tension in the remaining part, in the process of forming the end portion of the fiber layer. This needs complicated control of the fiber winding position and complicated control of the winding tension. This may cause a problem, for example, reduction of the production efficiency or reduction of the yield. This problem is not characteristic of the carbon fiber but may commonly arise in the case of winding any fiber by hoop winding. This problem is also not characteristic of the tank for the high-pressure fluid but may commonly arise in the case of winding the fiber on a tank used for any purpose. There is accordingly a need for a technique that reduces the possibility of positional misalignment of fiber during hoop winding and suppresses the complication of control with regard to winding of the fiber.

SUMMARY

According to one aspect of the disclosure, there is provided a manufacturing method of a tank. The method comprises winding a fiber on a liner as a base member of the tank by hoop winding, such as to sequentially form multiple fiber layers of the fiber from a side nearer to an outer circumferential face of the liner toward a side farther from the outer circumferential face of the liner, wherein the winding the fiber on the liner comprises: forming an (N+1)-th layer that is an (N+1)-th fiber layer from the side nearer to the outer circumferential face of the liner, where N denotes an integral number of not less than 1, such that a position closer to a center of the liner by a first predetermined distance along an axis line direction of the liner from an end in the axis line direction of an N-th layer that is an N-th fiber layer is set to position of an end in the axis line direction of the (N+1)-th layer with respect to a direction perpendicular to the axis line direction; and winding the fiber on the N-th layer to provide one winding turn of the fiber that is to be included in the (N+1)-th layer, such that a pressing force of pressing the N-th layer in the axis line direction by the fiber is equal to or smaller than a total frictional force in an area in the N-th layer on an edge side in the axis line direction of a fiber winding position.

DESCRIPTION OF EMBODIMENTS

A. First Embodiment

A1. Configuration of Tank

Figure 1:
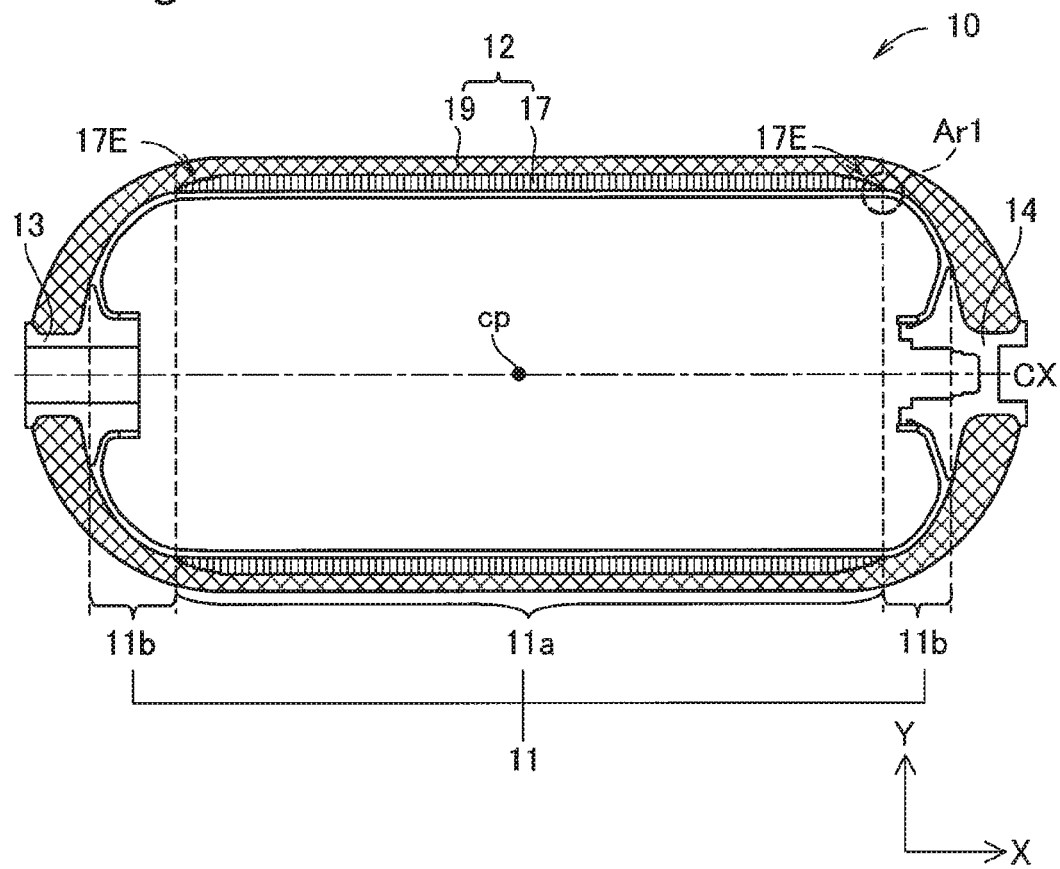
FIG. 1 is a sectional view illustrating the configuration of a tank manufactured by a manufacturing method of a tank according to one embodiment of the disclosure.

FIG. 1 is a sectional view illustrating the configuration of a tank manufactured by a manufacturing method of a tank according to one embodiment of the disclosure. For convenience of explanation, a glass fiber reinforced plastic (GFRP) layer that forms an outermost layer of a tank 10 is omitted from the illustration of FIG. 1. FIG. 1 illustrates a section including an axis line CX of a liner described later (liner 11) that is identical with an axis line of the tank 10.

The tank 10 is a tank used to store a high-pressure fluid such as high-pressure hydrogen gas and may include a liner 11 as a base member of the tank 10, two mouthpiece portions 13 and 14 and a reinforcement layer 12.

The liner 11 is a hollow base member and is made of low density polyethylene (LPDE) according to this embodiment. The liner 11 may, however, be made of another resin material such as high density polyethylene (HDPE) or linear low density polyethylene (L-LPDE), in place of low density polyethylene. The liner 11 includes a cylindrical portion 11a and two dome portions 11b connecting with respective ends of the cylindrical portion 11a. The cylindrical portion 11a is formed in a cylindrical outer shape. The cylindrical portion 11a has an axis line that is identical with the axis line CX of the liner 11 and is identical with the axis line of the tank 10. In FIG. 1, an X axis is set parallel to the axis line CX, and a Y axis is set perpendicular to the X axis. Each of the two dome portions 11b is formed in a dome outer shape. The mouthpiece portion 13 is mounted to a top of one dome portion 11b, and the mouthpiece portion 14 is mounted to a top of the other dome portion 11b.

The mouthpiece portion 13 is formed in a tubular outer shape with a shaft hole formed to have an axis line that is identical with the axis line CX and is configured to connect the hollow inside of the tank 10 (liner 11) with outside. A pipe or a valve is mounted to the mouthpiece portion 13. The mouthpiece portion 14 is formed in a similar shape to that of the mouthpiece portion 13 but has a closed shaft hole.

The reinforcement layer 12 is formed to cover an outer circumferential face of the liner 11 and outer circumferential side faces of the two mouthpiece portions 13 and 14. The reinforcement layer 12 is a carbon fiber reinforced plastic (CFRP) layer and is configured by winding a carbon fiber impregnated with a thermosetting resin (hereinafter may be simply referred to as "fiber") in multiple layers. The fiber is formed by bundling a large number of, for example, 20,000, carbon filaments of several μm (micrometer) in diameter. According to this embodiment, polyacrylonitrile (PAN)-based carbon fiber is used as the filament. The polyacrylonitrile (PAN)-based carbon fiber may be replaced by any of other various types of carbon fibers, for example, a rayon-based carbon fiber or a pitch-based carbon fiber. According to a modification, each filament may be impregnated with an ultraviolet curable resin, in place of the thermosetting resin.

The reinforcement layer 12 includes a hoop layer 17 and a helical layer 19. The hoop layer 17 is provided to cover the outer circumferential face of the cylindrical portion 11a. The hoop layer 17 is formed by winding the fiber in multiple layers by hoop winding. The hoop winding is a winding technique of winding the fiber on the cylindrical portion 11a at a winding angle approximately perpendicular to the axis line CX with a predetermined winding tension, while gradually shifting the winding position parallel to the axis line X. The helical layer 19 is provided to cover the outer circumferential faces of the dome portions 11b and the outer circumferential side faces of the two mouthpiece portions 13 and 14, in addition to the hoop layer 17 formed on the cylindrical portion 11a as described above. The helical layer 19 is formed by winding the fiber in multiple layers by helical winding. The helical winding is a winding technique of spirally winding the fiber on the entire liner 11 at a winding angle of larger than 0 degree and smaller than 90 degrees in a winding direction along the axis line CX, turning the winding direction at the dome portions 11b and winding the fiber again on the entire liner 11 at the winding angle of larger than 0 degree and smaller than 90 degrees. The hoop layer 17 and the helical layer 19 are formed by a manufacturing method of a tank described later. In the hoop layer 17 described above, both ends 17E along the axis line CX are formed in a step-like outer shape such that each layer forms one step and that the width (length in the longitudinal direction) along the axis line CX of each layer is increased with a decrease in distance from the liner 11 (cylindrical portion 11a).

Figure 2:
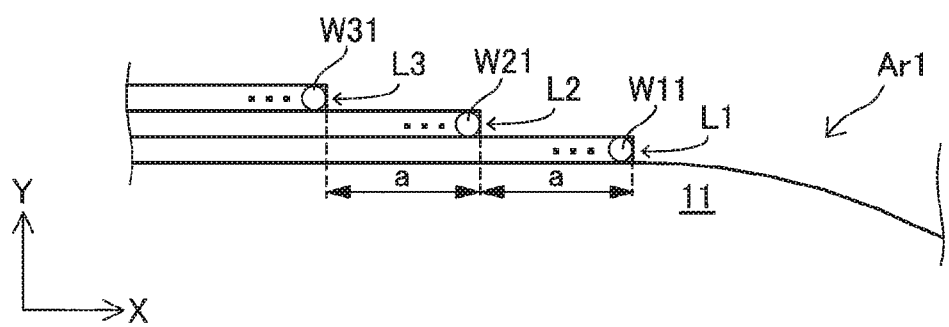
FIG. 2 is an enlarged view illustrating an area including one end of the hoop layer along the axis line.

FIG. 2 is an enlarged view illustrating an area Ar1 including one end of the hoop layer 17 along the axis line CX. The area Ar1 is an area including a +X-direction side end 17E of the hoop layer 17. Some parts of +Y-direction and −Y-direction regions in the area Ar1 shown in FIG. 1 are omitted from the illustration of FIG. 2. In the description below, fiber layers formed by hoop winding (hereinafter simply referred to as "fiber layers") are sequentially called as first layer, second layer, third layer, N-th layer and (N+1)-th layer from a side nearer to the liner 11 toward a side farther from the liner 11. FIG. 2 schematically illustrates part including a first layer L1, a second layer L2 and a third layer L3.

The first layer L1 is extended in the −X direction along the outer circumferential face of the liner 11 from a position near to the boundary between the +X direction-side dome portion 11b shown in FIG. 1 and the cylindrical portion 11a. More specifically, the first layer L1 is wound on the outer circumferential face of the liner 11 such that fiber cross sections of multiple winding turns are arrayed in the −X direction sequentially from a fiber cross section W11 (fiber cross section of one winding turn) located on the most +X direction side.

The second layer L2 is arranged on (on the +Y direction side of) the first layer L1 to be adjacent to the first layer L1. Like the first layer L1, the second layer L2 is wound on the outer circumferential face of the first layer L1 such that fiber cross sections of multiple winding turns are arrayed in the −X direction sequentially from a fiber cross section W21 (fiber cross section of one winding turn) located on the most +X direction side. The fiber cross section W21 is located at a position on the −X direction side by a predetermined distance a (hereinafter referred to as "first predetermined distance a") in a direction along the X axis (axis line CX) (hereinafter called "axis line direction") from a +X direction side end of the first layer L1. In other words, the second layer L2 is formed with setting a +X direction side end of the second layer L2 to a position closer to a center cp of the liner 11 in the axis line direction by the first predetermined distance a in the first layer L1, with respect to a direction (Y-axis direction) perpendicular to the axis line direction. The first predetermined distance a may be set to any distance. For example, the first predetermined distance a may be a distance corresponding to the diameter of the fiber. In another example, the first predetermined distance a may be a distance corresponding to the width of fifteen winding turns of the fiber.

The third layer L3 is arranged on (on the +Y direction side of) the second layer L2 to be adjacent to the second layer L2. Like the second layer L2, the third layer L3 is wound on the outer circumferential face of the second layer L2 such that fiber cross sections of multiple winding turns are arrayed in the −X direction sequentially from a fiber cross section W31 (fiber cross section of one winding turn) located on the most +X direction side. The fiber cross section W31 is located at a position on the −X direction side by the first predetermined distance a in the axis line direction from the +X direction side end of the second layer L2. In other words, the third layer L3 is formed with setting a +X direction side end of the third layer L3 to a position closer to the center op of the liner 11 in the axis line direction by the first predetermined distance a in the second layer L2, with respect to the direction (Y-axis direction) perpendicular to the axis line direction.

Each of a fourth layer and subsequent layers has the similar configuration to those of the three fiber layers L1 to L3 described above. The configuration of a −X direction side end 17E of the hoop layer 17 is similar to the configuration of the +X direction side end 17E described above.

The following describes the configuration of a fiber winding apparatus to wind the fiber on the liner 11 and thereby form the reinforcement layer 12 (hoop layer 17 and helical layer 19) described above with reference to FIG. 3.

A2. Configuration of Fiber Winding Apparatus

Figure 3:
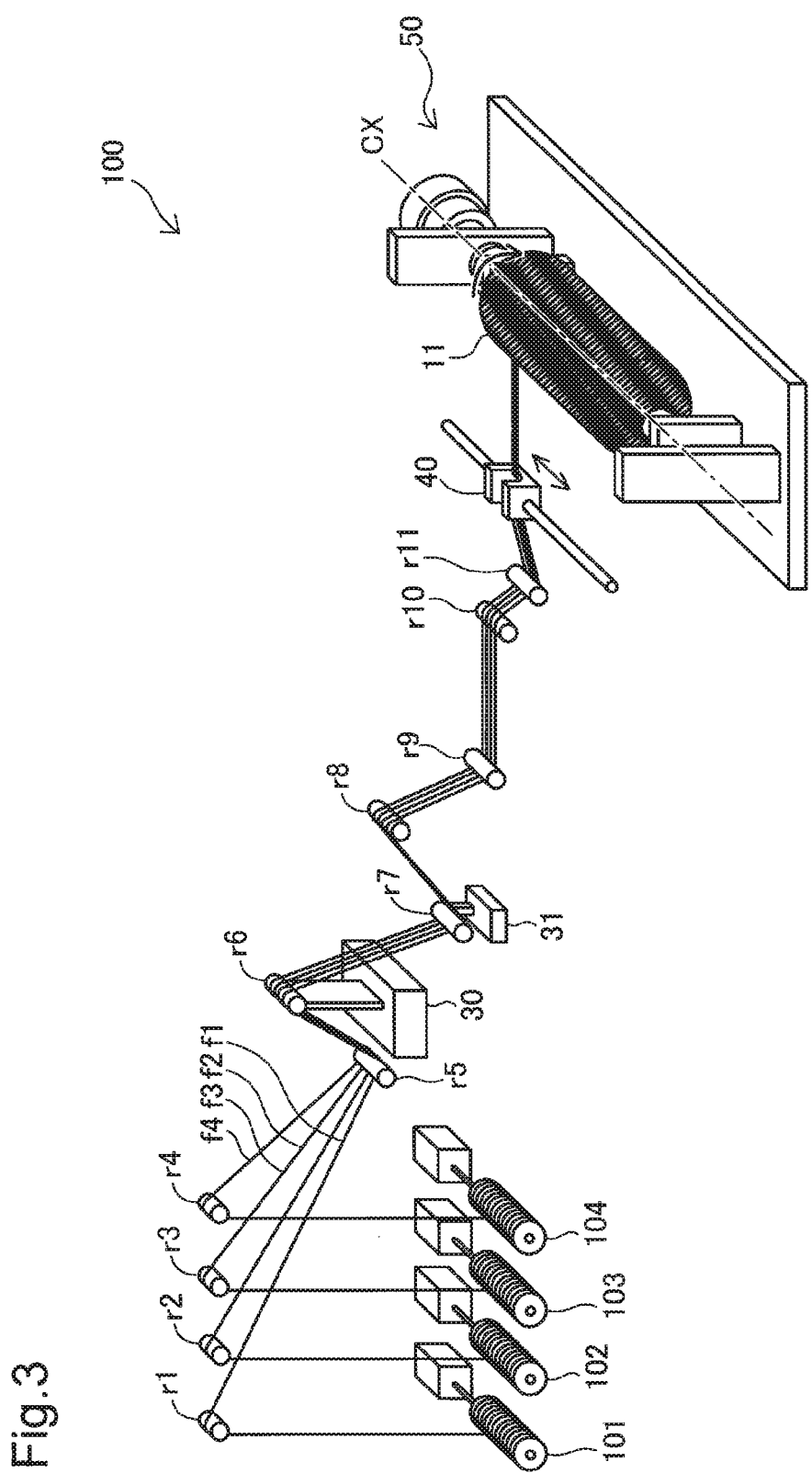
FIG. 3 is a perspective view illustrating the schematic configuration of a fiber winding apparatus used to manufacture the tank.

FIG. 3 is a perspective view illustrating the schematic configuration of a fiber winding apparatus 100 used to manufacture the tank 10. The fiber winding apparatus 100 may include four bobbins 101 to 104, eleven rollers r1 to r11, a tension adjustment device 30, an active dancer 31, a fiber feeder 40 and a winder 50. A fiber f1 is wound in advance on the bobbin 101. Similarly a fiber f2 is wound in advance on the bobbin 102, a fiber f3 is wound in advance on the bobbin 103, and a fiber f4 is wound in advance on the bobbin 104. The roller r1 serves to draw the fiber f1 from the bobbin 101 and introduce the fiber f1 to the roller r5. Similarly the roller r2 serves to draw the fiber f2 from the bobbin 102, the roller r3 serves to draw the fiber f3 from the bobbin 103 and the roller r4 serves to draw the fiber f4 from the bobbin 104. The respective fibers f2, f3 and f4 are introduced to the roller r5.

The rollers r5 to r11 are arranged to feed the fibers f1 to f4 to the downstream in the conveying direction, while changing the conveying direction of the fibers f1 to f4.

The tension adjustment device 30 is connected with the roller r6 and is configured to adjust the tensions of the fibers f1 to f4. Such adjustment of the tensions results in adjusting the winding tension in the process of winding the fiber on the liner 11.

The active dancer 31 is connected with the roller r7 and is configured to keep the tensions of the conveyed fibers f1 to f4 constant. The active dancer 31 serves to provide the constant tensions of the fibers to f4 during conveyance, for example, even when the winding of the fiber is stopped or even when the winding rate is changed.

The fiber feeder 40 is configured to bundle the four fibers f1 to f4 and feed the fiber bundle to the liner 11. The fiber feeder 40 is reciprocated parallel to the axis line CX by a mechanism such as linear actuator (not shown). The fiber bundle fed by the fiber feeder 40 is wound on the liner 11 that is set in advance in the winder 50. The winding of the fiber bundle, which is fed by the fiber feeder 40, on the liner 11 is controlled by regulating the reciprocation and the moving distance of the fiber feeder 40. The winder 50 is configured to rotate the liner 11 set therein about the axis line CX as the rotation axis.

A manufacturing method of the tank described below is performed using the fiber winding apparatus 100 of the above configuration. This reduces the possibility of positional misalignment of the fiber in the hoop layer 17 in the completed tank 10 and also suppresses the complication of control with regard to winding of the fiber.

A3. Manufacture of Tank

Figure 4:
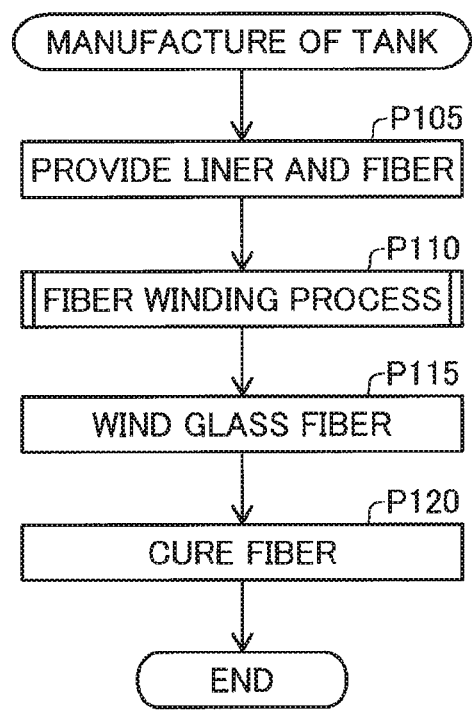
FIG. 4 is a process chart showing a manufacturing method of the tank according to the first embodiment.

FIG. 4 is a process chart showing a manufacturing method of the tank 10 according to the first embodiment. The liner 11 and the fiber are provided first (process P105). The two mouthpiece portions 13 and 14 are mounted to the liner 11 in advance. A fiber winding process (process P110) is subsequently performed.

Figure 5:
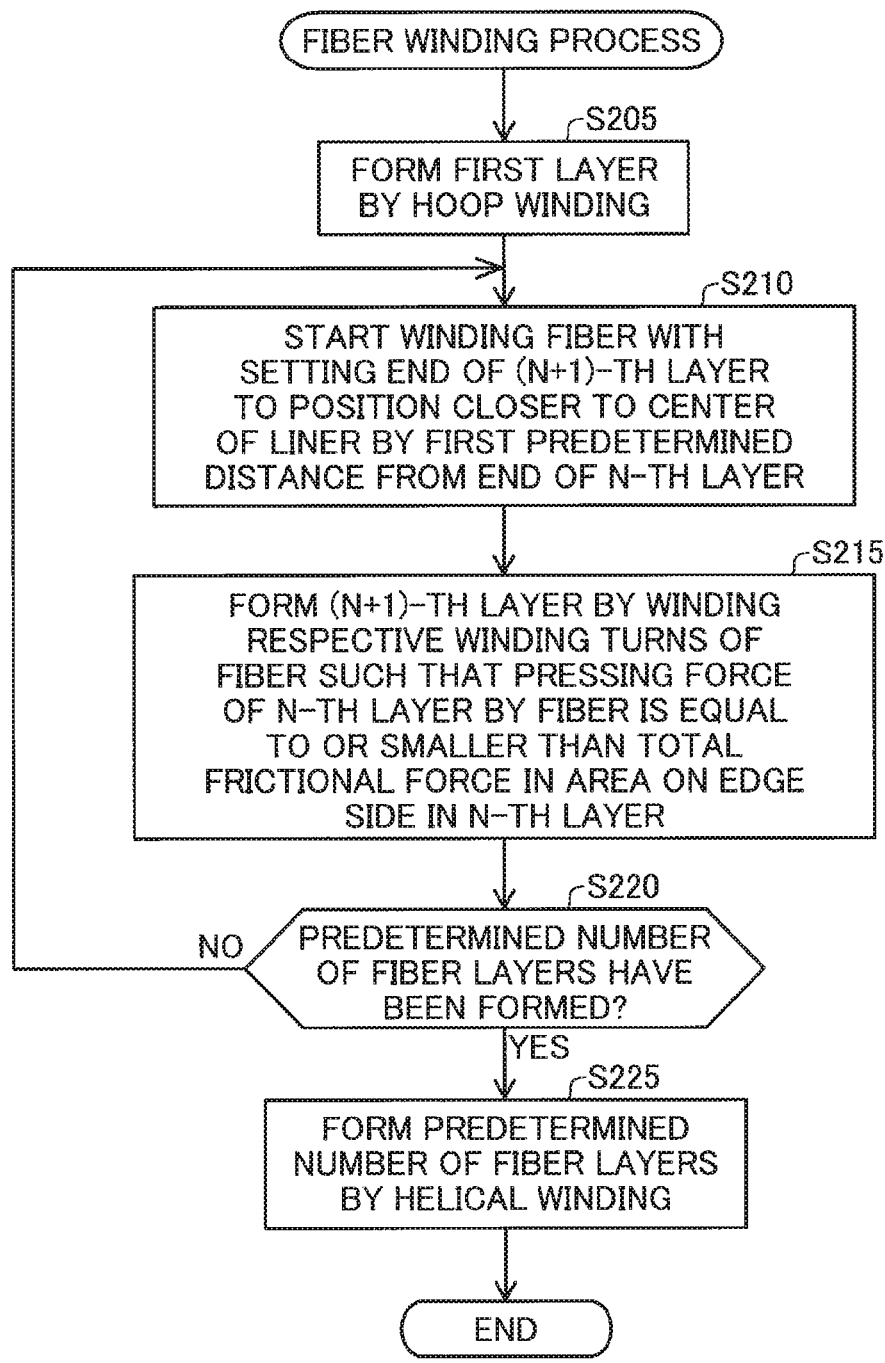
FIG. 5 is a process chart showing the detailed procedure of the fiber winding process.

FIG. 5 is a process chart showing the detailed procedure of the fiber winding process. The first layer L1 is formed on the liner 11 by hoop winding (process P205). A starting position where winding the first layer L1 is started is set in advance. The position of the end of the first layer L1 or more specifically the position of the fiber cross section W11 shown in FIG. 2 described above is also set in advance.

Winding the fiber is started with setting an end of the (N+1)-th layer to the position closer to the center cp of the liner 11 in the axis line direction by the first predetermined distance a from an end of the N-th layer (process P210). This process P210 may be regarded as the process of setting the fiber fed by the fiber feeder 40 at a predetermined position relative to the liner 11. This process P210 is performed repeatedly as described later. The number N is equal to 1 when the process P210 is performed immediately after formation of the first layer L1 at the process P205.

The (N+1)-th layer is formed by winding respective winding turns of the fiber on the N-th layer such that the pressing force of the N-th layer by the fiber is equal to or smaller than a total frictional force in an area on an edge side in the N-th layer (process P215). This process P215 is also performed repeatedly. The number N is equal to 1 when the process P215 is performed immediately after the process P210 with regard to the first layer L1. The second layer L2 is formed by winding respective winding turns of the fiber on the first layer L1.

Figure 6:
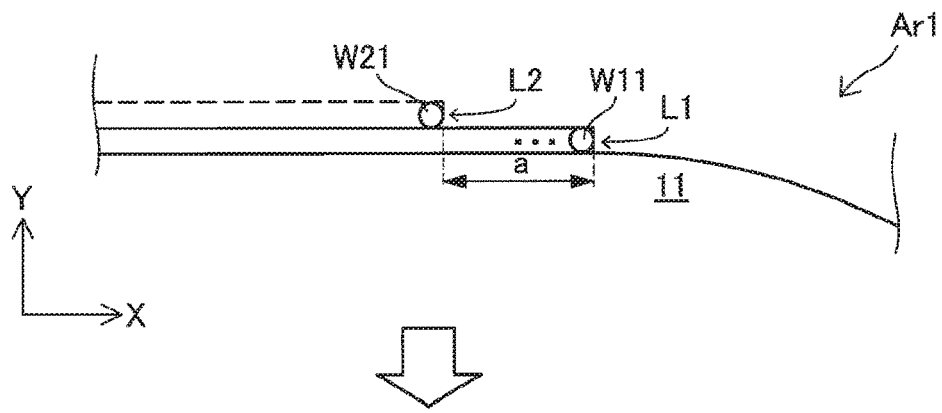
FIG. 6 is a diagram schematically illustrating the area immediately after start of formation of the second layer.

FIG. 6 is a diagram schematically illustrating the area Ar1 immediately after start of formation of the second layer L2. The upper drawing of FIG. 6 illustrates a first winding turn of the fiber when the process P215 is performed with regard to the second layer L2, and the lower drawing of FIG. 6 illustrates a second winding turn of the fiber when the process P215 is performed with regard to the second layer L2.

As illustrated in the upper drawing of FIG. 6, at the process P210, the winding position of the fiber corresponding to the fiber cross section. W21 is set with setting an end of the second layer L2 to a position closer to the center cp of the liner 11 in the axis line direction by the first predetermined distance a from an end of the first layer L1. As illustrated in the upper drawing of FIG. 6, the fiber cross section W21 is formed by winding the fiber from the set winding position to provide a first winding turn of the fiber. As illustrated in the lower drawing of FIG. 6, when the fiber is subsequently wound to provide a second winding turn of the fiber, a fiber cross section W22 of the second winding turn is formed on the −X direction side of the fiber cross section W21 to be adjacent to the fiber cross section W21.

Figure 7:
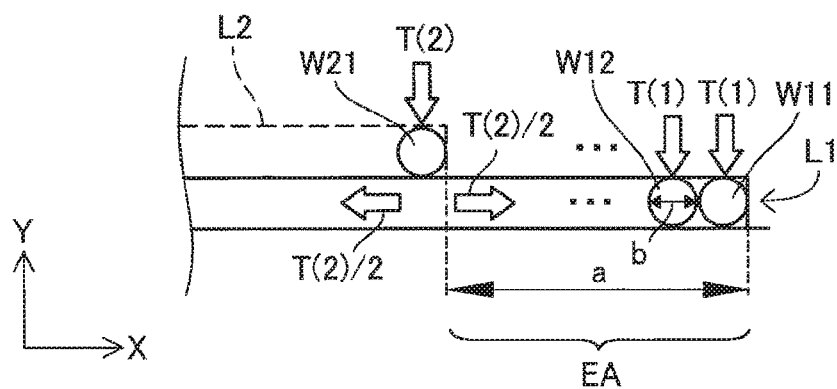
FIG. 7 is a diagram schematically illustrating the pressing force and the frictional force applied in the process of winding the fiber.

FIG. 7 is a diagram schematically illustrating the pressing force and the frictional force applied in the process of winding the fiber. FIG. 7 schematically illustrates the first layer L1 and the second layer L2 when the process P215 described above is performed. Some parts of −X direction regions of the first layer L1 and the second layer L2 are omitted from the illustration of FIG. 7. For convenience of explanation, FIG. 7 illustrates a fiber cross section W12, in addition to the fiber cross sections and W21 described above. The fiber cross section W12 is a fiber cross section located on the −X direction side of the fiber cross section W11 to be adjacent to the fiber cross section W11. This fiber cross section W12 is formed by winding the second winding turn of the fiber in the first layer L1. The respective winding turns of the fiber in the respective layers L1 and L2 have an identical diameter b.

The fiber is wound with a winding tension T(1) to provide respective winding turns of the fiber forming the first layer L1. This winding tension T(1) remains in the respective winding turns of the fiber forming the first layer L1. The fiber is wound with a winding tension T(2) to provide a first winding turn of the fiber forming the second layer L2. In this state, the first layer L1 is pressed in the +X direction and in the −X direction relative to the first winding turn of the fiber (fiber cross section W21) of the second layer L2 about the corresponding position in the second layer L2 with respect to the direction (Y-axis direction) perpendicular to the axis line direction. The pressing force in each of the +X direction and −X direction is a force that is one half of the winding tension T(2) (i.e., T(2)/2). At the process P215, the fiber is wound to provide the first winding turn of the second layer L2 such that this pressing force (T(2)/2) becomes smaller than a total frictional force in an area EA in the first layer L1 on an edge side (on the +X direction side) along the axis line of the fiber winding position (more specifically, the fiber winding position of the first winding turn of the second layer L2).

Figure 8:
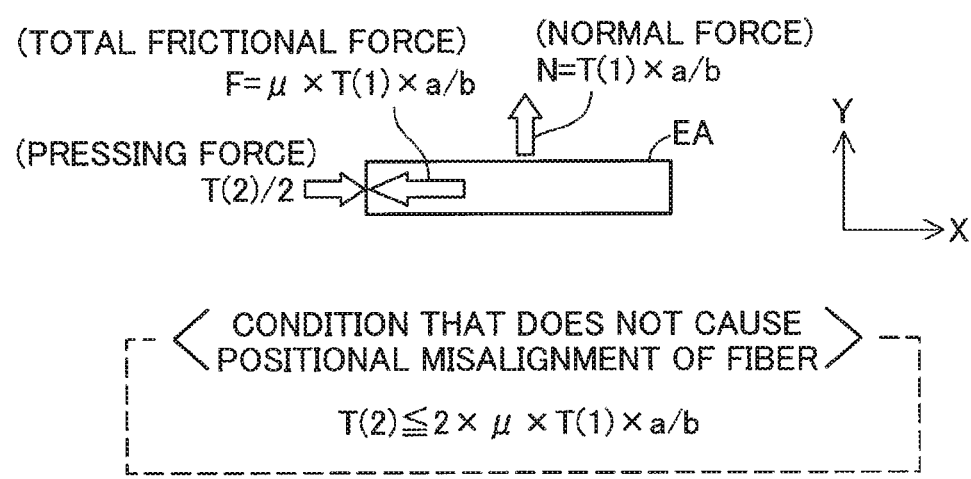
FIG. 8 is a diagram schematically illustrating a condition that does not cause a positional misalignment of the fiber in the first layer.

FIG. 8 is a diagram schematically illustrating a condition that does not cause a positional misalignment of the fiber in the first layer L1. A normal force N (+Y direction force applied by the liner 11) in the area EA is a value expressed by Equation (A) given below. In Equation (A) given below, T(1) denotes a winding tension applied to wind each winding turn of the fiber in the first layer L1, a denotes the first predetermined distance and b denotes the diameter of the wound fiber:

$$N = T(1) \times a/b \quad (A)$$

A total frictional force F in the area EA against the above pressing force is a value expressed by Equation (B) given below. In Equation (B) given below, μ a denotes a coefficient of friction:

$$F = \mu \times N = \mu \times T(1) \times a/b \quad (B)$$

Accordingly, in order to prevent a positional misalignment of the fiber forming the first layer L1 by winding the fiber to provide the first winding turn of the second layer L2, the above pressing force (T(2)/2) should be smaller than the total frictional force F. In other words, Expression (C) given below should be satisfied:

$$T(2)/2 \leq \mu \times T(1) \times a/b \quad (C)$$

When the process P215 is performed with regard to the second layer L2, the fiber is wound such that the winding tension T(2) applied to wind the first winding turn of the fiber in the second layer L2 satisfies Expression (D) given below. This reduces the possibility of positional misalignment of the fiber forming the first layer L1 by winding the fiber to provide the first winding turn of the second layer L2.

$$T(2) \leq 2 \times \mu \times T(1) \times a/b \quad (D)$$

The winding tension T(2) that satisfies Expression (D) given above, the winding tension T(1) applied to form the first layer L1 and the first predetermined distance a are experimentally or otherwise determined in advance and are set in the fiber winding apparatus 100. The tensions of the fibers f1 to f4 are adjusted to the set winding tension T(2) by the tension adjustment device 30. Expression (D) given above is not only applied to the first layer L1 and the second layer L2 but is applicable to the N-th layer and the (N+1)-th layer. Accordingly Expression (D) given above may be generalized as Expression (E) given below:

$$T(N+1) \leq 2 \times \mu \times T(N) \times a/b \quad (E)$$

Referring back to FIG. 5, after formation of the (N+1)-th layer, it is determined whether a predetermined number of fiber layers have been formed (process P220). When it is determined that the predetermined number of fiber layers have not yet been formed (process P220: NO), the processing flow returns to the process P210 described above. Another fiber layer is subsequently formed on a fiber layer formed in a previous cycle of the process P210 and the process P215. When it is determined that the predetermined number of fiber layers have already been formed (process P220: YES), on the other hand, a predetermined number of fiber layers are subsequently formed by helical winding (process P225). This completes the fiber winding process.

Referring back to FIG. 4, after completion of the fiber winding process (process P110) described above, a glass fiber is wound on the surface of the helical layer 19 (process P115). This glass fiber is impregnated with a thermosetting resin, like the above fiber (carbon fiber). The thermosetting resin used here may be identical with the resin which the above fiber (carbon fiber) is impregnated with. According to a modification, the glass fiber may be impregnated with an ultraviolet curable resin, in place of the thermosetting resin.

After winding of the glass fiber, a fiber curing process is performed to heat the entire liner 11 with the fiber and the glass fiber wound thereon and thereby cure the fiber (process P120). This fiber curing process cures the fiber (carbon fiber) wound on the liner 11 and the thermosetting resin included in the glass fiber, so as to form the reinforcement layer 12 (CFRP layer) and a GFRP layer on the outer circumferential face of the liner 11 and thereby complete the tank.

When the fiber is wound to provide one winding turn of the fiber that is to be included in the (N+1)-th layer, the manufacturing method of the tank described above winds the fiber on the N-th layer such that the pressing force (T(2)/2) of pressing the N-th layer by the fiber becomes smaller than the total frictional force (F) in the area EA in the N-th layer on the edge side along the axis line direction of the fiber winding position. This reduces the possibility of positional misalignment of the fiber forming the N-th layer caused by winding of the fiber. The occurrence of such positional misalignment is likely to meander the fiber in the hoop layer or to meander the fiber that is to be wound on the hoop layer by helical winding. For example, when the fiber in the end portion is shifted outward along the axis line direction to be moved toward the dome portion 11b, there is a possibility that the remaining winding tension is released to decrease the strength of the hoop layer. The manufacturing method of the tank according to the first embodiment, however, reduces the possibility of positional misalignment of the fiber as described above and thereby suppresses the occurrence of meandering of the fiber and reduction of the strength of the tank.

The process of winding the fiber with the winding tension shown by Expression (E) given above is also performed for the fiber in the end portion that is generally likely to cause a positional misalignment. This reduces the possibility of positional misalignment of the fiber. Furthermore, this configuration does not require any complicated control for the purpose of reducing the possibility of positional misalignment of the fiber, for example, accurately controlling the fiber winding position or providing multiple winding turns of the fiber at only the position near to the end of each fiber layer and thereby suppresses the complication of the control with regard to winding of the fiber.

Additionally, in the fiber winding process P110, when the respective winding turns of the fiber are wound to form one identical fiber layer, the fiber is wound with the constant winding tension. This simplifies the control with regard to winding of the fiber.

In the tank 10 manufactured according to this embodiment, the possibility of positional misalignment of the fiber is reduced. This results in reducing the possibility of positional misalignment of the fiber at the position near to the end of each fiber layer. There is accordingly no meandering of the wound fiber at the position near to the end of each fiber layer. Additionally, winding of the fiber with setting in advance the distances between adjacent fibers (hereinafter referred to as "inter-fiber distance") to be approximately equal to each other in the N-th layer and in the (N+1)-th layer reduces the possibility of positional misalignment at the position near to the end of each fiber layer in the completed tank 10. This accordingly allows for measurement of the approximately equal inter-fiber distances in the N-th layer and in the (N+1)-th layer.

B. Second Embodiment

Figure 9:
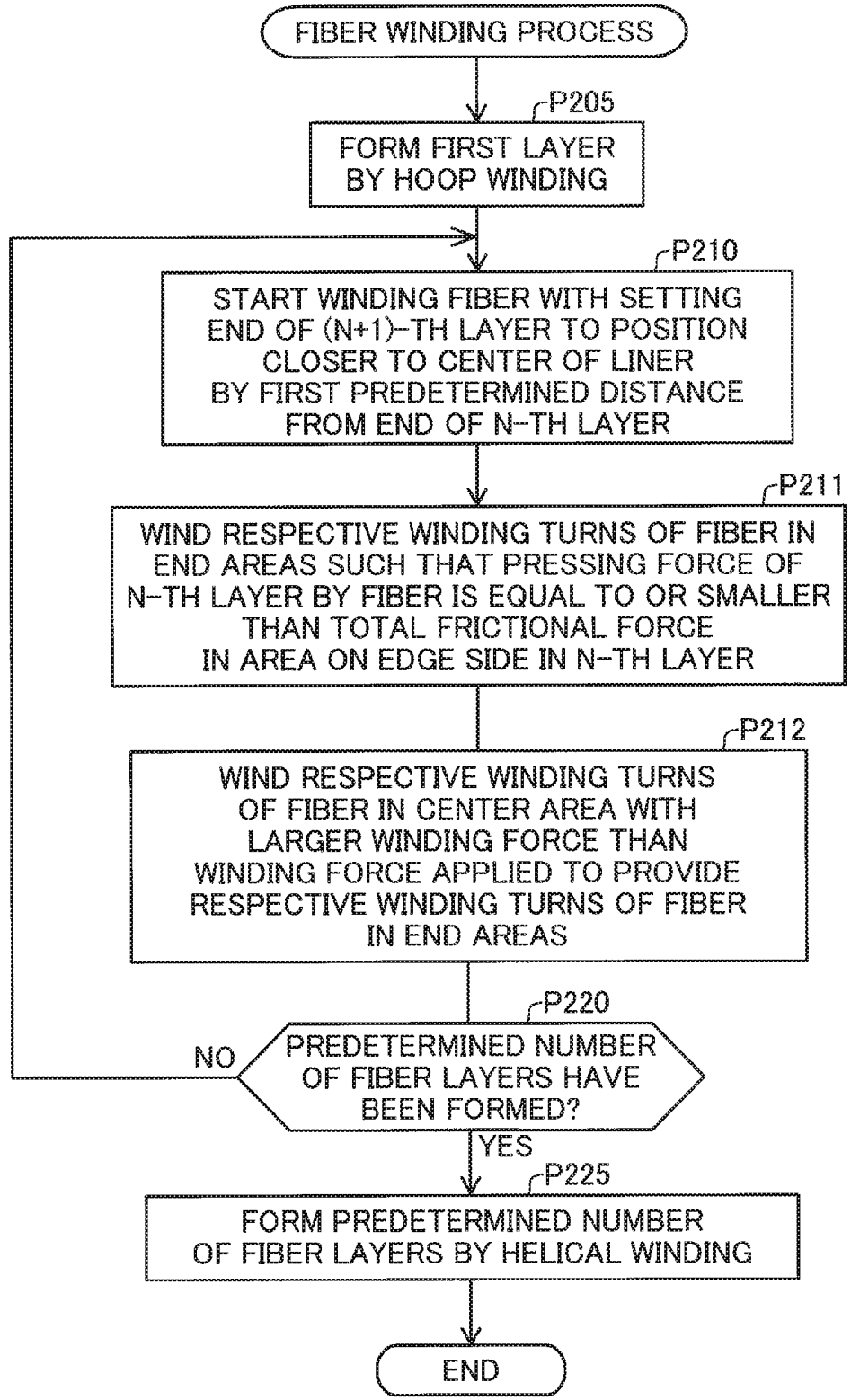
FIG. 9 is a process chart showing the detailed procedure of the fiber winding process according to a second embodiment.

FIG. 9 is a process chart showing the detailed procedure of the fiber winding process according to a second embodiment. The configuration of a tank and the configuration of a fiber winding apparatus according to the second embodiment are similar to the configuration of the tank 10 and the configuration of the fiber winding apparatus 100 according to the first embodiment. The like components are expressed by the like reference signs and are not described in detail. A manufacturing method of the tank according to the second embodiment differs from the manufacturing method of the tank according to the first embodiment by the detailed procedure of the fiber winding process. More specifically, as shown in FIG. 9, the fiber winding process of the second embodiment differs from the fiber winding process of the first embodiment by performing process P211 and process P212 in place of the process P215. Otherwise the procedure (process) of the fiber winding process of the second embodiment is similar to the procedure of the fiber winding process of the first embodiment. The like procedure (process) is expressed by the like process number and is not described in detail.

As shown in FIG. 9, after completion of the process P210, each winding turn of the fiber is wound in end areas (end areas 171 described later) such that the pressing force of the N-th layer by the fiber is equal to or smaller than a total frictional force in the area on the edge side in the N-th layer (process P211). This process P211 differs from the process P215 of the first embodiment described above by that the subject of fiber winding by this process is only part of the area (i.e., the end areas) in the layer to be currently formed.

Figure 10:
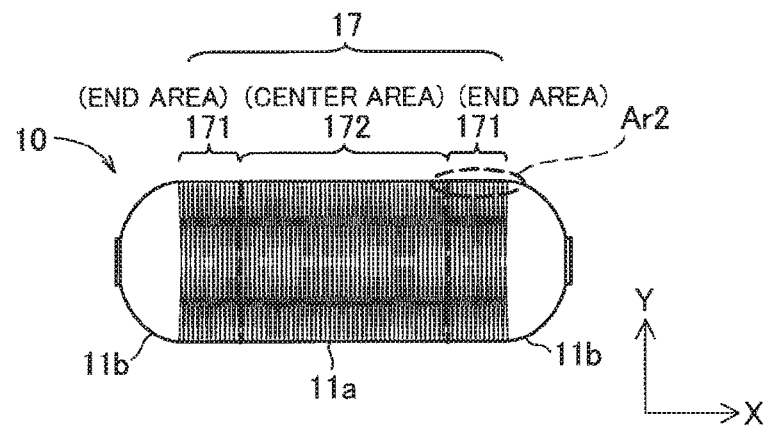
FIG. 10 is a diagram illustrating end areas and a center area in the hoop layer.
Figure 11:
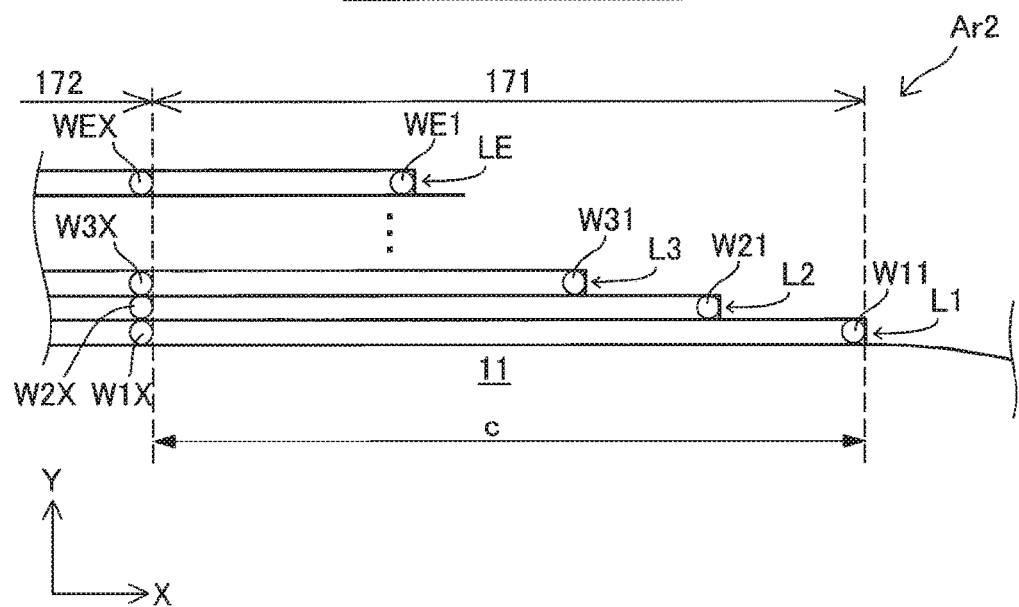
FIG. 11 illustrates an outermost fiber layer, in addition to the three fiber layers described above.

FIG. 10 is a diagram illustrating end areas and a center area in the hoop layer 17. FIG. 11 is an enlarged view schematically illustrating an area Ar2 in FIG. 10. FIG. 11 illustrates an outermost fiber layer LE, in addition to the three fiber layers L1 to L3 described above.

As illustrated in FIG. 10, two end areas 171 and a center area 172 are set in advance in the hoop layer 17 according to this embodiment. The center area 172 is a continuous central area along the X-axis direction in the hoop layer 17, and the end areas 171 are areas from the respective ends of the center area 172 to the respective ends of the hoop layer 17.

As illustrated in FIG. 11, the end area 171 on the +X direction side is an area of the respective fiber layers from a +X direction side end of the first layer L1 to a position toward the −X direction side (position closer to the center cp of the liner 11) in the axis line direction by a predetermined distance c (hereinafter referred to a "second predetermined distance c"). The respective winding turns of the fiber included in this area 171 are wound with the winding tension that satisfies Expression (E) given above. At the above process P211, the fiber is wound in both the end area 171 on the +X direction side and the end area 171 on the −X direction side. The second predetermined distance c may be set to any distance. For example, the second predetermined distance a may be set to such a distance that sets a −X direction end of the end area 171 to a position toward the −X direction side by 50 mm (millimeter) from a +X direction side end of the fiber layer LE.

Referring back to FIG. 9, after completion of the process P211, the respective winding turns of the fiber are wound in the center area 172 with a larger winding force than a winding force applied to wind the respective winding turns of the fiber in the end areas 171 (process P212). For example, fiber cross sections W1X, W2X, W3X and WEX located on a +X direction side edge in the center area 172 shown in FIG. 11 are wound with the larger winding tension than the winding tension applied to wind the respective winding turns of the fiber in the end areas 171 of the respective corresponding fiber layers. As shown in FIG. 9, after completion of the process P212, the process P220 and the process P225 described above are preformed, and the fiber winding process is terminated.

The manufacturing method of the tank according to the second embodiment described above has similar advantageous effects to those of the manufacturing method the tank according to the first embodiment. More specifically, the configuration of the second embodiment reduces the possibility of positional misalignment of the fiber in the end area 171 that is generally likely to cause a positional misalignment. Additionally, the fiber is wound to provide the respective winding turns of the fiber in the center area 172 with the larger winding force than the winding force applied to wind the respective winding turns of the fiber in the end area 171. This enhances the strength of the hoop layer 17. When the respective winding turns of the fiber are wound in the center area 172 of a target fiber layer, an extremely large number of fibers are present from the position corresponding to the current fiber winding position to the edge side in an underneath layer immediately below the target fiber layer. This provides an extremely large total frictional force. Even when the respective winding turns of the fiber are wound in the center area with the larger winding force than the winding force applied to wind the fiber in the end areas, this configuration reduces the possibility of positional misalignment of the fiber in the end areas.

C. Modifications

C1. Modification 1

The fiber (winding turn of fiber) as the subject of winding the fiber with the winding tension that satisfies the above Expression (E) is all the winding turns of the fiber according to the first embodiment and is the winding turns of the fiber included in the end areas 171 according to the second embodiment. The present disclosure is, however, not limited to these configurations. For example, according to a modification, the fiber may be wound with a winding tension that does not satisfy the above Expression (E) with regard to a predetermined number of winding turns of the fiber from an end, and the fiber may be wound with the winding tension that satisfies the above Expression (E) with regard to subsequent winding turns of the fiber along the axis line direction toward the center cp of the liner 11. This modified configuration has similar advantageous effects to those of the respective embodiments with regard to at least the fiber in an underneath layer corresponding to the fiber wound with the winding tension that satisfies the above Expression (E).

C2. Modification 2

According to the first embodiment, the respective winding turns of the fiber forming one identical fiber layer are wound with the constant winding force. According to the second embodiment, the respective winding turns of the fiber forming one identical fiber layer in the end area 171 and those in the center area 172 are wound respectively with the constant winding forces. The present disclosure is, however, not limited to these configurations. In the first embodiment, for example, the fiber may be wound with the winding force gradually increasing along the axis line direction toward the center cp of the liner 11. On the contrary, in the first embodiment, the fiber may be wound with the winding force gradually decreasing along the axis line direction toward the center op of the liner 11. In the second embodiment, for example, the fiber may be wound with the winding force gradually increasing along the axis line direction toward the center cp of the liner 11 in at least one of the end area 171 and the center area 172. On the contrary, in the second embodiment, the fiber may be wound with the winding force gradually decreasing along the axis line direction toward the center cp of the liner 11 in at least one of the end area 171 and the center area 172. In another example, the fiber may be wound such that the variation in the winding force is alternately changed by every predetermined number of winding turns between gradually increasing the winding force of the fiber along the axis line direction toward the center cp of the liner 11 and gradually decreasing the winding force of the fiber along the axis line direction toward the center cp of the liner 11.

C3. Modification 3

In the second embodiment, the respective winding turns of the fiber are wound in the center area 172 with the larger winding force than the winding force applied to wind the respective winding turns of the fiber in the end areas 171. The present disclosure is, however, not limited to this configuration. On the contrary to the second embodiment, the respective winding turns of the fiber may be wound in the center area 172 with the smaller winding force than the winding force applied to wind the respective winding turns of the fiber in the end areas 171.

C4. Modification 4

In each of the embodiments described above, when the fiber is wound to provide one winding turn of the fiber that is to be included in the (N+1)-th layer, the fiber may be wound on the N-th layer with the smaller winding force than the winding force applied to wind the fiber at a corresponding position in the N-th layer, with respect to the direction (Y-axis direction) perpendicular to the axis line direction. This modified configuration suppresses excessive tightness of winding in each of the fiber layers to the N-th layer and the liner and thereby suppresses deformation of the tank 10.

C5. Modification 5

The procedure of the second embodiment winds the fiber in both the end area 171 on the +X direction side and the end area 171 on the −X direction side at the process P211 and subsequently winds the fiber in the center area 172 at the process P212. The present disclosure is, however, not limited to this configuration. A procedure of modification may wind the fiber in the end area 171 on the +X direction side, subsequently wind the fiber in the center area 172 and then wind the fiber in the end area 171 on the −X direction side. This modified configuration performs the process similar to the above process P211 with regard to the end area 171 on the +X direction side and the end area 171 on the −X direction side and performs the process similar to the above process P212 with regard to the center area 172, thus providing similar advantageous effects to those of the second embodiment.

C6. Modification 6

In the respective embodiments, the fibers wound on the liner 11 are the carbon fiber and the glass fiber. The present disclosure is, however, not limited to this configuration. Any other fibers, for example, any of metal fibers and resin fibers may be wound on the liner 11. In the respective embodiments, the tank 10 is provided as the tank for the high-pressure fluid. The tank 10 is, however, not limited to the tank for the high-pressure fluid but may be any tank used for any purpose.

The disclosure is not limited to any of the embodiments and the modifications described above but may be implemented by a diversity of other configurations without departing from the scope of the disclosure. For example, the technical features of any of the embodiments and the modifications may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

(1) According to one aspect of the disclosure, there is provided a manufacturing method of a tank. The method comprises winding a fiber on a liner as a base member of the tank by hoop winding, such as to sequentially form multiple fiber layers of the fiber from a side nearer to an outer circumferential face of the liner toward a side farther from the outer circumferential face of the liner, wherein the winding the fiber on the liner comprises: forming an (N+1)-th layer that is an (N+1)-th fiber layer from the side nearer to the outer circumferential face of the liner, where N denotes an integral number of not less than 1, such that a position closer to a center of the liner by a first predetermined distance along an axis line direction of the liner from an end in the axis line direction of an N-th layer that is an N-th fiber layer is set to position of an end in the axis line direction of the (N+1)-th layer with respect to a direction perpendicular to the axis line direction; and winding the fiber on the N-th layer to provide one winding turn of the fiber that is to be included in the (N+1)-th layer, such that a pressing force of pressing the N-th layer in the axis line direction by the fiber is equal to or smaller than a total frictional force in an area in the N-th layer on an edge side in the axis line direction of a fiber winding position.

In the manufacturing method of the tank according to this aspect, when the fiber is wound to provide one winding turn of the fiber that is to be included in the (N+1)-th layer, the fiber is wound on the N-th layer such that the pressing force of pressing the N-th layer by the fiber becomes smaller than the total frictional force in the area in the N-th layer on the edge side along the axis line direction of the fiber winding position. This configuration reduces the possibility of positional misalignment of the fiber forming the N-th layer caused by winding of the fiber. Furthermore, this configuration does not require any complicated control for the purpose of reducing the possibility of such positional misalignment, for example, accurately controlling the fiber winding position or providing multiple winding turns of the fiber at only the position near to the end portion and thereby suppresses the complication of the control with regard to winding of the fiber.

(2) In the manufacturing method of the tank of the above aspect, the winding the fiber on the N-th layer such that the pressing force is equal to or smaller than the total frictional force may be performed for the fiber included in an end area that is an area of respective fiber layers from an end of a first layer to a position closer to the center of the liner along the axis line direction by a second predetermined distance, out of the fiber forming the (N+1)-th layer. In the manufacturing method of the tank according to this aspect, the process of winding the fiber on the N-th layer such that the pressing force is equal to or smaller than the total frictional force is performed for the fiber in the end area that is generally likely to cause a positional misalignment. This configuration more effectively reduces the possibility of positional misalignment of the fiber, compared with a configuration that does not perform this process for the fiber in the end area.

(3) In the manufacturing method of the tank of the above aspect, the winding the fiber on the liner may further comprise winding the fiber on the N-th layer to form the end area of the (N+1)-th layer, with a constant winding force. In the manufacturing method of the tank according to this aspect, the fiber is wound an the N-th layer to form the end area with the constant winding force. This configuration simplifies the control with regard to winding of the fiber to form the end area.

(4) In the manufacturing method of the tank of the above aspect, the winding the fiber on the liner may further comprise a process of winding the fiber on the N-th layer to form a center area of the (N+1)-th layer that is an area closer to the center of the liner along the axis line direction than the end area, with a larger winding force than a winding force applied to wind the fiber to form the end area of the (N+1)-th layer.

The manufacturing method of the tank according to this aspect winds the fiber on the N-th layer to form the center area with the larger winding force than the winding force applied to wind the fiber to form the end area, while reducing the possibility of positional misalignment of the fiber in the end area that is generally likely to cause a positional misalignment. This configuration enhances the strength of the fiber layer formed by hoop winding.

(5) In the manufacturing method of the tank of the above aspect, the winding the fiber on the liner may further comprise winding the fiber on the N-th layer to provide one winding turn of the fiber that is to be included in the (N+1)-th layer, with a smaller winding force than a winding force applied to wind the fiber at a corresponding position in the N-th layer, with respect to a direction perpendicular to the axis line direction. In the manufacturing method of the tank according to this aspect, when the fiber is wound to provide one winding turn of the fiber that is to be included in the (N+1)-th layer, the fiber is wound on the N-th layer with the smaller winding force than the winding force applied to wind the fiber at the corresponding position in the N-th layer, with respect to the direction perpendicular to the axis line direction. This configuration suppresses excessive tightness of winding in each of the fiber layers to the N-th layer and the liner and thereby suppresses deformation of the tank.

The present disclosure may be implemented by any of various other aspects, for example, a fiber winding method, a fiber winding apparatus or a tank.

What is claimed is:

1. A manufacturing method of a tank, comprising:
winding a fiber on a liner as a base member of the tank by hoop winding, such as to sequentially form multiple fiber layers of the fiber from a side nearer to an outer circumferential face of the liner toward a side farther from the outer circumferential face of the liner, wherein the winding the fiber on the liner comprises:
forming an (N+1)-th layer that is an (N+1)-th fiber layer from the side nearer to the outer circumferential face of the liner, where N denotes an integral number of not less than 1, such that a position closer to a center of the liner by a first predetermined distance along an axis line direction of the liner from an end in the axis line direction of an N-th layer that is an N-th fiber layer is set as a position of an end in the axis line direction of the (N+1)-th layer with respect to a direction perpendicular to the axis line direction; and
winding the fiber on the N-th layer to provide one winding turn of the fiber that is to be included in the (N+1)-th layer, such that a pressing force of pressing the N-th layer in the axis line direction by the fiber is equal to or smaller than a total frictional force in an area in the N-th layer on an edge side in the axis line direction of a fiber winding position, and
wherein the N-th layer is not provided with a protrusion including a protrusion formed by a greater number of winding turns of the fiber than a number of winding turns of the fiber to form an other portion of the N-th layer.

2. The manufacturing method of the tank according to claim 1, wherein
the winding the fiber on the N-th layer such that the pressing force is equal to or smaller than the total frictional force is performed for the fiber included in an end area that is an area of respective fiber layers from an end of a first layer to a position closer to the center of the liner along the axis line direction by a second predetermined distance, out of the fiber forming the (N+1)-th layer.

3. The manufacturing method of the tank according to claim 2, wherein
the winding the fiber on the liner further comprises:
winding the fiber on the N-th layer to form the end area of the (N+1)-th layer, with a constant winding force.

4. A manufacturing method of a tank, comprising:
winding a fiber on a liner as a base member of the tank by hoop winding, such as to sequentially form multiple fiber layers of the fiber from a side nearer to an outer circumferential face of the liner toward a side farther from the outer circumferential face of the liner, wherein the winding the fiber on the liner comprises:

forming an (N+1)-th layer that is an (N+1)-th fiber layer from the side nearer to the outer circumferential face of the liner, where N denotes an integral number of not less than 1, such that a position closer to a center of the liner by a first predetermined distance along an axis line direction of the liner from an end in the axis line direction of an N-th layer that is an N-th fiber layer is set as a position of an end in the axis line direction of the (N+1)-th layer with respect to a direction perpendicular to the axis line direction;

winding the fiber on the N-th layer to provide one winding turn of the fiber that is to be included in the (N+1)-th layer, such that a pressing force of pressing the N-th layer in the axis line direction by the fiber is equal to or smaller than a total frictional force in an area in the N-th layer on an edge side in the axis line direction of a fiber winding position, wherein the winding the fiber on the N-th layer such that the pressing force is equal to or smaller than the total frictional force is performed for the fiber included in an end area that is an area of respective fiber layers from an end of a first layer to a position closer to the center of the liner along the axis line direction by a second predetermined distance, out of the fiber forming the (N+1)-th layer;

winding the fiber on the N-th layer to form the end area of the (N+1)-th layer, with a constant winding force; and winding the fiber on the N-th layer to form a center area of the (N+1)-th layer that is an area closer to the center of the liner along the axis line direction than the end area, with a larger winding force than a winding force applied to wind the fiber to form the end area of the (N+1)-th layer.

5. A manufacturing method of a tank, comprising:

winding a fiber on a liner as a base member of the tank by hoop winding, such as to sequentially form multiple fiber layers of the fiber from a side nearer to an outer circumferential face of the liner toward a side farther from the outer circumferential face of the liner, wherein the winding the fiber on the liner comprises:

forming an (N+1)-th layer that is an (N+1)-th fiber layer from the side nearer to the outer circumferential face of the liner, where N denotes an integral number of not less than 1, such that a position closer to a center of the liner by a first predetermined distance along an axis line direction of the liner from an end in the axis line direction of an N-th layer that is an N-th fiber layer is set as a position of an end in the axis line direction of the (N+1)-th layer with respect to a direction perpendicular to the axis line direction;

winding the fiber on the N-th layer to provide one winding turn of the fiber that is to be included in the (N+1)-th layer, such that a pressing force of pressing the N-th layer in the axis line direction by the fiber is equal to or smaller than a total frictional force in an area in the N-th layer on an edge side in the axis line direction of a fiber winding position; and winding the fiber on the N-th layer to provide one winding turn of the fiber that is to be included in the (N+1)-th layer, with a smaller winding force than a winding force applied to wind the fiber at a corresponding position in the N-th layer, with respect to a direction perpendicular to the axis line direction.

* * * * *